(12) United States Patent
Pineau et al.

(10) Patent No.: US 6,976,084 B2
(45) Date of Patent: Dec. 13, 2005

(54) METHOD AND APPARATUS FOR PRINTING REMOTE IMAGES USING A NETWORK-ENABLED PRINTER

(75) Inventors: Richard A. Pineau, No. Andover, MA (US); Sandra B. Lawrence, Brookline, MA (US)

(73) Assignee: Polaroid Corporation, Waltham, MA (US)

( * ) Notice: Subject to any disclaimer, the term of this patent is extended or adjusted under 35 U.S.C. 154(b) by 766 days.

(21) Appl. No.: 10/022,924

(22) Filed: Dec. 18, 2001

(65) Prior Publication Data

US 2002/0184378 A1 Dec. 5, 2002

(51) Int. Cl.$^7$ .............................................. G06F 13/00
(52) U.S. Cl. ...................... 709/232; 709/203; 358/1.15
(58) Field of Search ................................ 709/203, 230, 709/232; 358/1.15; 348/207.2

(56) References Cited

U.S. PATENT DOCUMENTS

| | | | | |
|---|---|---|---|---|
| 5,673,190 A | * | 9/1997 | Kahleck et al. ................. | 700/2 |
| 5,742,905 A | * | 4/1998 | Pepe et al. .................... | 455/461 |
| 5,991,290 A | * | 11/1999 | Malik ......................... | 370/352 |
| 6,314,476 B1 | * | 11/2001 | Ohara ......................... | 710/15 |
| 6,356,356 B1 | * | 3/2002 | Miller et al. ................. | 358/1.15 |
| 6,445,694 B1 | * | 9/2002 | Swartz ........................ | 370/352 |
| 6,473,498 B1 | * | 10/2002 | Foth .......................... | 379/93.09 |
| 6,594,032 B1 | * | 7/2003 | Hiroki et al. ................. | 358/1.15 |
| 6,633,635 B2 | * | 10/2003 | Kung et al. ................... | 379/215.01 |
| 2002/0051197 A1 | * | 5/2002 | Minegishi ..................... | 358/1.15 |
| 2002/0060808 A1 | * | 5/2002 | Henderson et al. ............. | 358/1.15 |
| 2005/0024499 A1 | * | 2/2005 | Luciano et al. ................ | 348/207.2 |

FOREIGN PATENT DOCUMENTS

| EP | 0 598 513 A1 | 5/1994 |
|---|---|---|
| EP | 1 100 003 A2 | 5/2001 |

OTHER PUBLICATIONS

U.S. Appl. No. 09/870,536, filed May 30, 2001.
U.S. Appl. No. 09/540,538, filed May 30, 2001.
U.S. Appl. No. 10/023,245, filed Dec. 18, 2001.

* cited by examiner

*Primary Examiner*—Kenneth R. Coulter

(57) ABSTRACT

Techniques are disclosed for coupling a printer to a communications network (such as the a Plain Old Telephone Service network), downloading printing information (such as a digital image) to the printer over the communications network, and using the printer to print output based on the printing information. A user may use the printer to connect to a printing server that serves the printing information. Prior to transmission of the printing information to the printer, the printing server may process the printing information to tailor the printing information based on the capabilities of the printer. The printing server may communicate with the printer using one or more printing protocols. The printer may be equipped with a controller for communicating according to the printing protocol. Downloads of printing information to the printer may be interrupted and subsequently resumed from the point of interruption.

3 Claims, 5 Drawing Sheets

METHOD AND APPARATUS FOR PRINTING REMOTE IMAGES USING A NETWORK-ENABLED PRINTER

CROSS REFERENCE TO RELATED APPLICATIONS

This application is related to application Ser. No. 09/870,538, filed on May 30, 2001, entitled "Method and Apparatus for Printing Remote Images Using a Mobile Device and Printer," which is hereby incorporated by reference in its entirety.

This application is related to a commonly-owned and concurrently filed application entitled "Method and System for Generating a Permanent Record of a Service at a Remote Printer," U.S. application Ser. No. 10/023,245, filed on Dec. 18, 2001 which is hereby incorporated by reference in its entirety.

BACKGROUND

1. Field of the Invention

The present invention relates to techniques for printing digital images and, more particularly, to techniques for printing remote images using a printer having telephonic communication capabilities.

2. Related Art

The Internet, and in particular the World Wide Web (the "Web"), is increasingly being used to store and exchange information and to perform commercial transactions. Although the Web was originally only capable of storing and displaying textual information, the Web may now be used to store, display, and exchange a wide variety of textual, graphical, and audiovisual information such as digital images and full-motion video.

Digital photography, for example, is becoming increasingly popular, spurred in large part by the advent of low-cost, high-quality digital cameras. An increasing number of web sites allow users to upload digital photographs and other digital images to the Web, whereby such images may subsequently be viewed, shared, edited, and printed on conventional printers using computers connected to the Web using conventional Internet connections.

To print a digital image from the Web, a user must typically use a conventional desktop or laptop computer to establish a Web connection using a conventional modem or other network connection device. The user must then locate the digital image (such as a digital photograph) to be printed or complete a transaction that produces an image (such an a ticket) to be printed. The user must then typically download the located image from the Web site to the computer. To print the image, the user must typically issue a "print" command to the Web browser or other software executing on the computer.

Such a process can be cumbersome for the user and may restrict the range of circumstances in which the user may print digital images from the Web. For example, the conventional method described above involves several discrete steps, each of which must be initiated by the user: locating the desired image, downloading the image to a host computer, and issuing a print command to print the image.

Locating the desired image may be difficult if the user does not know or remember the precise Web address of the image to be printed. Even if the user does remember, for example the address of the home page of the Web site on which the image is stored, it may be necessary for the user to perform several steps to navigate a Web browser to the precise image to be downloaded.

If the image to be printed cannot be printed directly from the Web page on which it is stored, it may be necessary for the user to download the image to the host computer. This may require the user to perform several steps, such as selecting the image, providing a filename for the image, and selecting a location on a local storage device (such as a hard disk drive) in which the image is to be stored.

Printing the image may also be problematic. For example, if the image has been downloaded to a local storage device, the user may have to locate the image on the storage device and open the image file using imaging software before issuing a print command. The print command may fail for a variety of reasons, such as a faulty connection between the host computer and the printer or the absence of an appropriate printer driver on the host computer. After printing the image, the user typically must manually delete the downloaded image file from the local storage device.

In particular, it may be difficult and/or time consuming for a user to print images that are generated as a result of a non-Web transaction. Consider, for example, a user who purchases a ticket (such as a concert ticket or airline ticket) over the telephone. If such a transaction generates a ticket that is accessible over the Web for printing, the conventional system described above would require the user to connect the host computer to the Web, locate the image of the ticket using a Web browser, and print the image. Such a process requires the user to engage in a significant amount of post-transaction activity and may be particularly difficult for those users who have chosen to conduct the transaction (e.g., purchase the ticket) over the telephone because they are not familiar with using computers in general or the Web in particular. Users who are unable to print the resulting ticket may become dissatisfied with the associated service and fail to become repeat customers.

It should therefore be apparent that the process of printing images from the Web using a conventional computer connected to a conventional printer can be a tedious, time-consuming, and error-prone process.

Furthermore, the requirement that the printer be connected to a host computer has a variety of disadvantages. For example, a mobile computer user who desires the ability to print images from a variety of locations (such as at home and at the office) must have access to a Web-connected computer in each such location. Using the techniques described above, even a small mobile printer must be connected to a computer to print images from the Web. As a result, a user who wishes to print such remote images may be required to travel with both a printer and a laptop computer, or may be limited to printing images from locations at which a Web-connected desktop computer is available. The requirement that the printer be connected to a computer therefore limits the mobility of the user and limits the range of locations from which images may be remotely printed.

What is needed, therefore, are improved techniques for downloading and printing digital images.

SUMMARY

Techniques are disclosed for coupling a printer to a communications network (such as a Plain Old Telephone Service network), downloading printing information (such as a digital image) to the printer over the communications network, and using the printer to print output based on the printing information. Downloads may be interrupted and subsequently resumed from the point of interruption.

The printer includes a network communications device, such as a modem, that enables the printer to connect directly to the communications network. The printing information may be downloaded to the printer in any of a variety of ways. For example, the printer may establish a connection to a printing server that serves the printing information. A connection between the printer and the printing server may be established, for example, by using the printer to place a telephone call to the printing server over a Plain Old Telephone Service (POTS) network. The printer may then download the printing information over the POTS network and print the image specified by the printing information.

It should be appreciated that the printing information may have previously been generated in any of a variety of ways. For example, as described in more detail in the above-referenced application entitled "Method and Apparatus for Printing Remote Images Using a Mobile Device and Printer," the user may have previously conducted a transaction with a transaction server. The transaction may, for example, be a transaction for requesting or purchasing items such as tickets, maps, brochures, coupons, photographs, menus, or schedules. Upon completion of the transaction, the transaction server may communicate with the printing server described above to produce the printing information to be printed (such as a digital image of the purchased item). The printing information may be transmitted to the printer by, for example, the printing server or the transaction server.

Prior to transmission of the printing information to the printer, the printing server may process the printing information to tailor the printing information based on the capabilities of the printer. For example, the printing server may tailor the printing information to comport with the resolution and/or color depth at which the printer is capable of printing. The printer may, for example, transmit information descriptive of its capabilities to the printing server over any of the connections described above at any appropriate time. Additional details about ways in which the printing server may processing the printing information are contained in the above-referenced application entitled "Method and Apparatus for Printing Remote Images Using a Mobile Device and Printer."

The printing server and/or the transaction server may communicate with the printer using one or more printing protocols for communicating over the connections described above. The printer may be equipped with a controller implemented in hardware, software, or any combination thereof for communicating according to the printing protocol through a port on the printer that is coupled to the communications network.

If the download of printing information to the printer is interrupted, the printer may terminate its connection to the printing server. For example, if the printer is connected to the printing server over a POTS telephone line that has call waiting enabled, the printer may terminate its connection to the printing server in response to receipt of an incoming call on the telephone call during a download. The user may then answer the phone and engage in a voice telephone call over the telephone line. Upon termination of the voice telephone call, a connection between the printer and the server may be re-established over the telephone line and the previously interrupted download may be resumed from the point at which it was interrupted. For example, the printer may automatically call the server to resume the interrupted download upon termination of the user's voice telephone call. The ability to interrupt and resume downloads may be used to allow incoming telephone calls to be received during a download and therefore to facilitate use of a single telephone line for downloading printing information and for voice telephone calls.

Additional aspects and embodiments of the present invention and advantages thereof will be described in more detailed below.

DETAILED DESCRIPTION

In one aspect of the present invention, techniques are provided for enabling a printer to download an image directly over a communications network (such as a Plain old Telephone Service network), and for printing the downloaded image using the printer. The image may be downloaded over the communications network to the printer without using a host computer (such as a desktop or laptop computer) as an intermediary.

Figure 1:
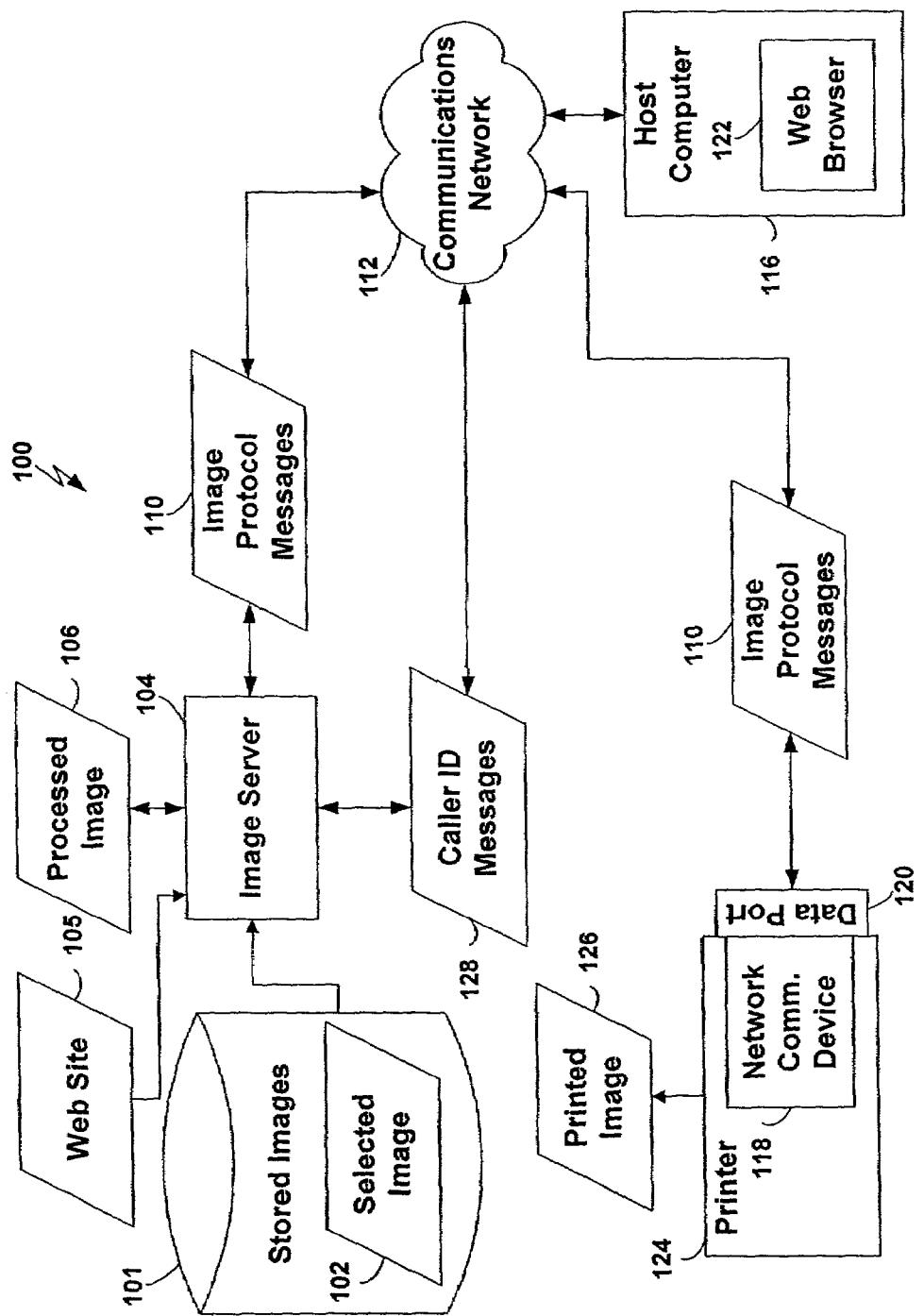
FIG. 1 is a block diagram of a system for downloading and printing an image from an image server using a network-enabled printer according to one embodiment of the present invention.

For example, referring to FIG. 1, a system 100 is shown which may be used in one embodiment of the present invention to download a selected image 102 from an image server 104 to a printer 124 and to print the selected image 102 using the printer 124. As shown in FIG. 1, the printer 124 is connected directly to a communications network 112 through a data port 120 on the printer 124, without the use of an intermediate host computer. To enable the printer 124 to establish a connection over the communications network 112, the printer 124 may, for example, be equipped with an internal network communications device 118 (such as a modem or network interface card) having an external data port 120.

Operation of the system 100 is now described in more detail. As shown in FIG. 1, an image server 104 serves a plurality of stored images 101. The image server 104 is accessible over the communications network 112. For example, in one embodiment of the present invention, the image server 104 is a web server that hosts a web site 105 through which stored images 101 may be accessed. In such an embodiment, image server 104 may provide a convenient user interface through which users may upload, download, and view stored images. Examples of techniques for uploading images to such a web server are described in more detail in the co-pending patent application Ser. No. 09/870,536, filed on May 30, 2001, entitled "Method and System for Remote Utilizing a Mobile Device to Share Data Objects."

In another embodiment, a separate application server (not shown) provides the primary content and functionality of web site 105 for uploading, downloading, and viewing stored images 101. The application server may also manage other information such as user profiles and user usage statistics. In such an embodiment, the image server 104 may perform the limited tasks of storing and retrieving stored images 101 as instructed by the application server. As a result, in such an embodiment the combination of the application server and the image server 104 provide a coherent user experience in which the user may upload, download, and view stored images 101.

The functions performed by the image server 104 may be further subdivided into additional servers and/or applications as may be convenient for a particular purpose. It should be appreciated, therefore, that the single image server 104 is described herein as performing all functions related to web site 105 and stored images 101 merely for ease of illustration and explanation.

To download a selected image 102 from among the stored images 101, a connection is first established between the image server 104 and the printer 124 over the communications network 112. Either the image server 104 or the printer 124 may initiate the connection.

For example, consider one embodiment in which the communications network 112 is a Plain Old Telephone Service (POTS) network and the network communications device 118 is a modem. The printer 124 may initiate a connection with the image server 104 over the POTS network by dialing a predetermined telephone number associated with the image server 104. The image server 104 may be equipped with a corresponding modem that answers the telephone call placed by the printer 124. The image server 104 and printer 124 may then negotiate and establish a connection over the POTS network in any of a variety of ways that are well-known to those of ordinary skill in the art.

Alternatively, the printer 124 may call a predetermined toll-free telephone number to connect to a computer that may provide the printer 124 with a telephone number or other address of the image server 104. Techniques for locating the image server 104 in this manner are described in more detail in the co-pending application Ser. No. 09/842,754, filed on Apr. 26, 2001, entitled "Method and Apparatus for Remote Processing and Sharing of Digital Images," hereby incorporated by reference in its entirety.

Alternatively, the image server 104 may initiate a connection with the printer 124 over the POTS network by dialing a predetermined telephone number associated with the printer 124. The network communications device 118 (in this case, a modem) inside the printer 124 may answer the telephone call placed by the image server 104, and the image server 104 and printer 124 may then negotiate and establish a connection over the POTS network.

The connection between the printer 124 and image server 104 may be initiated in response to any of a variety of events. For example, in one embodiment of the present invention, the user may press a "Print" button on the printer 124 to instruct the printer 124 to establish a connection to the image server 104 and to download and print the selected image 102. In this embodiment, the printer 124 is designed to dial a telephone number associated with the image server 104 when the "Print" button is pressed, thereby initiating a connection to the image server 104 over the communications network 112.

Once a connection is established between the printer 124 and the image server 104, the printer 124 may download the selected image 102 over the established connection. Image server 104 and printer 124 may communicate with each other using messages 110 transmitted over the communications network 112. As described in more detail below, messages 110 may be defined in accordance with an image printing protocol designed to facilitate performance of functions such as downloading the selected image 102 to the printer 124.

If the download of the selected image 102 to the printer is interrupted, the printer 124 may terminate its connection to the image server 104. For example, if the printer 124 is connected to the image server 104 over a POTS telephone line that has call waiting enabled, the printer 124 may terminate its connection to the image server 104 in response to receipt of an incoming call on the telephone call during a download. The user may then answer the phone and engage in a voice telephone call over the telephone line. A connection between the printer 124 and image server 104 may be re-established upon termination of the voice telephone call to complete the download of the selected image 102 to the printer. Techniques for performing such interruption and resumption of downloads are described in more detail in the co-pending application Ser. No. 09/842,754, filed on Apr. 26, 2001, entitled "Method and Apparatus for Remote Processing and Sharing of Digital Images."

As described in more detail in the above-referenced application entitled "Method and Apparatus for Printing Remote Images Using a Mobile Device and Printer," the image server 104 may perform various kinds of processing on the selected image 102 to produce a processed image 106. The image server 104 may then transmit the processed image 106, rather than the original selected image 102, to the printer 124. It should therefore be appreciated that any references herein to downloading of the selected image 106 by the printer 124 may be understood to refer to the processed image 106 in cases where the processed image 106 is transmitted to the printer 124, and that any references herein to downloading of the processed image 106 by the printer 124 may be understood to refer to the selected image 102 in cases where the image server 104 does not perform any processing on the selected image 102.

Once the printer 124 has downloaded the processed image 106, the printer 124 may print the processed image 106 on an output medium (such as plain paper) using conventional techniques.

Figure 2:
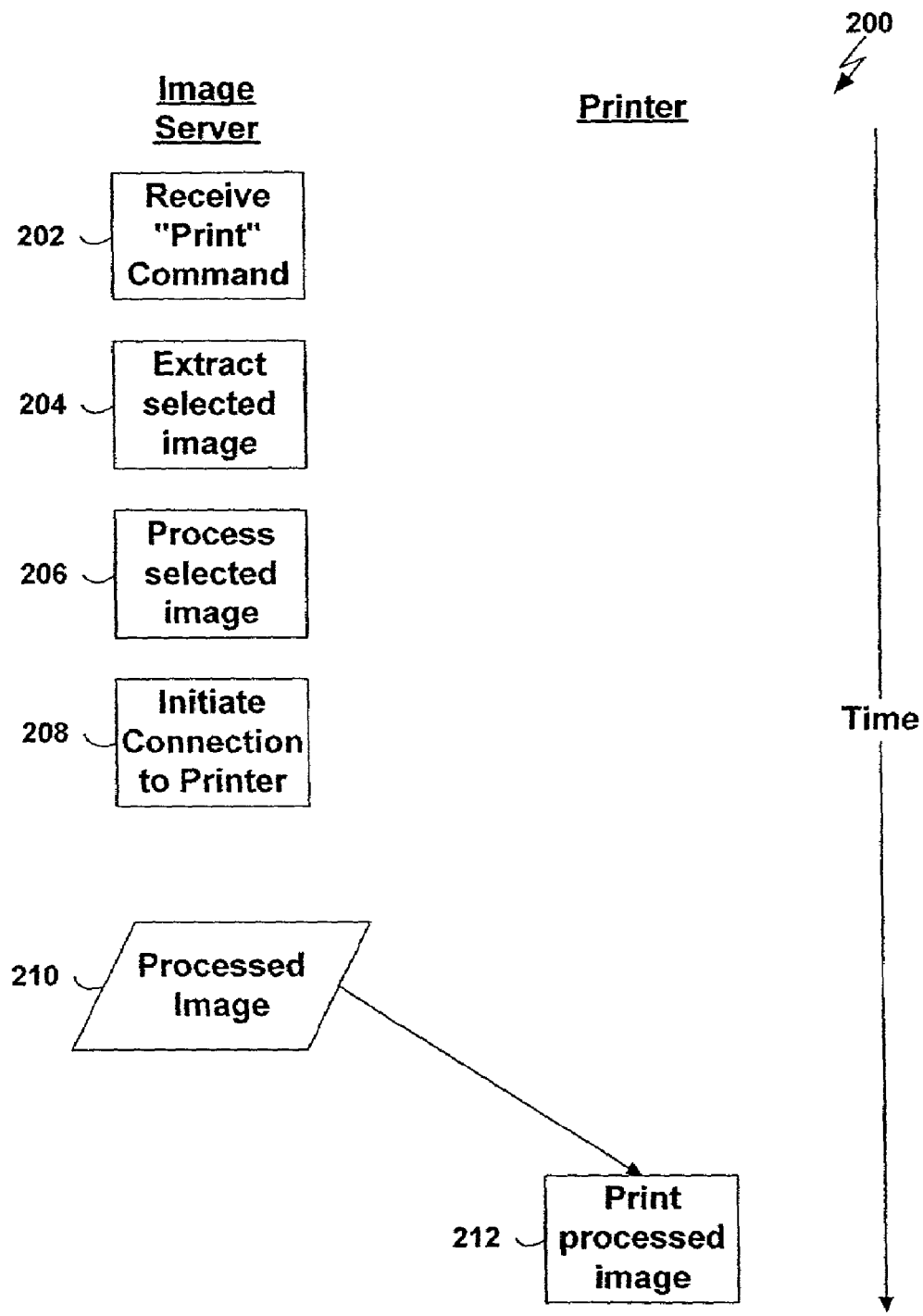
FIG. 2 is a data flow diagram of a process that is used by the system of FIG. 1 to print an image according to a first embodiment of the present invention.

Referring now to data flow diagram 200 of FIG. 2, an example of a process 200 that may be used to download and print the selected image 102 using the system 100 shown in FIG. 1 is now described. FIG. 2 illustrates actions performed and messages transmitted by the image server 104 and the printer 124. More specifically, diagram 200 includes two columns, corresponding to the image server 104 and printer 124, respectively. An action performed by one of these components is indicated by a rectangle in the corresponding column, and a message transmitted by the component is indicated by a non-rectangular parallelogram in the corresponding column. A message transmitted by a first component to a second component is indicated by a parallelogram describing the message in the first component's column, connected to an arrow ending in the second component's column. Diagram 200 has a time axis which runs downward, indicating the sequence in which actions are performed and messages are transmitted. The description of FIG. 2 below will further clarify the diagram 200.

Prior to initiation of the process 200 shown in FIG. 2, a user has selected the selected image 102. The user may select the selected image 102 by, for example, using a web browser 122 executing on the host computer 116 to browse to a web page in web site 105 through which the stored images 101 served by image server 104 may be accessed. The web page may, for example, be a web page having a user interface that simulates a page of a photo album.

As described in more detail in the co-pending patent application Ser. No. 09/870,536, filed on May 30, 2001, entitled "Method and System for Remote Utilizing a Mobile Device to Share Data Objects," users may create an account on the web site 105. When a user creates such an account, information about the user, such as the user's login name, password, and cell telephone number (obtained using caller ID), are recorded by the image server 104 in a database. Creation of such an account enables personalization of features provided by web site 105, such as creation of personalized photo albums to which the user's digital photographs may be uploaded.

Upon navigating to the web site 105, the user may log in to his account using the web browser 122. The image server 104 may then display a personalized web page to the user, such as by displaying the user's personalized photo album to the user. For example, the stored images 101 may be divided into directories corresponding to different user accounts and/or different photo albums. If the user has not previously created an account, the image server 104 may prompt the user to create a new account. It should be appreciated that the use of user accounts is described herein merely for purposes of example and does not constitute a limitation of the present invention. Rather, printing and downloading of images may be performed without the creation or use of user accounts.

After browsing to the web page containing the selected image 102, the user may select the image 102 for printing. The selected image 102 may be any of the stored images 101. The user may perform such a selection by, for example, clicking on a thumbnail of the image 102. The user may then issue a "print" command to print the selected image 102. The user may issue such a command by, for example, clicking on a "print" button on the web page containing the selected image 102. The print command may be transmitted by the host computer 116 to the image server 104 using techniques that are well known to those of ordinary skill in the art.

In response to receipt of the "print" command (step 202), the image server 104 extracts the selected image 102 (step 204) and optionally processes the selected image 102 to generate processed image 106 (step 206). The image server 104 may, for example, maintain an individualized print queue (not shown) for each user who has an account on the web site 105. After generating the processed image 106 in step 206, the image server 104 may add the processed image 106 to an individualized print queue associated with the current user. If, as described above, the user selected the selected image 102 while logged in to the user's account on the web site 105, the image server 104 may use the user's account information (e.g., the user's login name) to identify the individualized print queue that is associated with the user.

The image server 104 next initiates a connection to the printer 124 over the communications network 112 (step 208). The image server 104 may initiate this connection in any of a variety of ways. For example, if the communications network 112 is a POTS network, the image server 104 may initiate a connection to the printer 124 by placing a telephone call to the printer's network communications device 118 (in this case, a modem). If, as described above, the user selected the selected image 102 while logged in to the user's account on the web site 105, the image server 104 may obtain the telephone number for the network communications device 118 from the user's account information.

After initiating a connection to the printer 124, the image server 104 transmits the processed image 106 (and, if applicable, any other images that are in the user's individualized print queue) to the printer 124 over the communications network 112 using the image printing protocol (step 210). Printer 124 then prints the processed image 106 (step 212).

It should be appreciated that the techniques described above have a variety of advantages. For example, it is not required that printer 124 be connected to image server 104 through an intermediate computer, such as host computer 116. The ability to connect the printer 124 directly to the communications network 112 without the use of an intermediate host computer increases the user's mobility when printing, particularly if the printer 124 is a portable printer.

Figure 3:
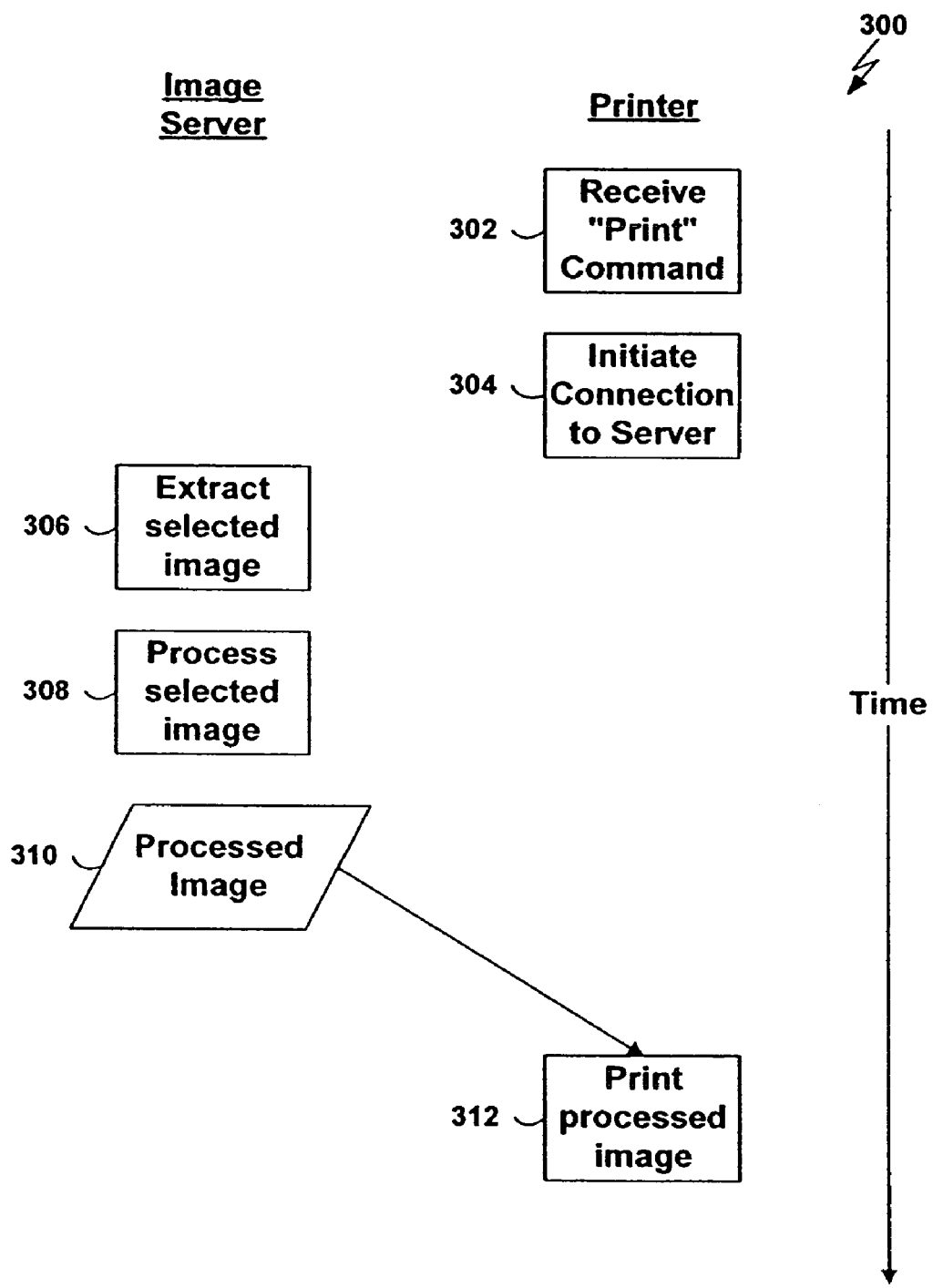
FIG. 3 is a data flow diagram of a process that is used by the system of FIG. 1 to print an image according to a second embodiment of the present invention.

Referring now to data flow diagram 300 of FIG. 3, an example of another process 300 that may be used to download and print the selected image 102 using the system 100 shown in FIG. 1 is now described. Prior to initiation of the process 200 shown in FIG. 2, a user has selected the selected image 102 as described above with respect to FIG. 2.

After selecting the selected image 102, the user may issue a "print" command to the printer 124. The printer 124 may, for example, be equipped with a "Print" button that the user may press to instruct the printer 124 to download and print the selected image 102. In response to receipt of the "print" command (step 302), the printer 124 initiates a connection to the image server 104 over the communications network 112 using any of the techniques described above. If, for example, the communications network 112 is a POTS network, the printer 124 may place a telephone call to the server 104 over the POTS network 112 using the network communications device 118 (in this case, a modem) to initiate a connection to the image server 104. The printer 124 may obtain the telephone number for the image server 104 in any of a variety of ways. For example, upon pressing the printer's "Print" button, the printer 124 may prompt the user for the image server's telephone number, which the user may then enter through a keypad on the printer 124. Alternatively, for example, the printer 124 may allow the user to pre-configure the printer 124 with the telephone number or Internet address of the image server 104 so that the printer 124 may automatically connect to the image server 124 without having to prompt the user for such information each time the printer's "Print" button is pressed.

Once a connection between the printer 124 and the image server 104 is established, the image server 104 extracts the selected image 102 (step 306) and optionally processes the selected image 102 to generate processed image 106 as described above with respect to FIG. 2 (step 308). The image server 104 may identify the image 102 that was previously selected by the user in any of a variety of ways. For example, as described in more detail in the above-referenced application entitled "Method and Apparatus for Printing Remote Images Using a Mobile Device and Printer," the image server 104 may use caller ID messages (not shown) to identify the telephone number associated with the printer 124. The image server 104 may then identify the user's account based on the identified telephone number. The user's account may store a record of the particular image 102 that was previously selected by the user for printing. Alternatively, the printer 124 may store and transmit information about the user, such as the user's login name and password, to the image server 104 so that the image server 104 may identify the particular image 102 that was previously selected by the user for printing.

For example, as described above, the image server 104 may maintain individualized print queue for different users. When a user selects an image for printing, or otherwise generates an image to print, the image server 104 may identify the user's individualized print queue and add the image to the identified print queue. When a connection is subsequently established between the image server 104 and the printer 124 for purposes of printing one or more images, the image server 104 may identify the particular print queue from which images are to be printed in any of a variety of ways. For example, the printer 124 may have a unique serial number. The image server 104 may identify the printer 124 with a particular user by storing the printer's serial number with the user's account information. Upon the establishment of a connection between the image server 104 and the printer 124, the printer 124 may transmit its serial number to the image server 104, whereby the image server 104 may identify the user—and thereby the individualized print queue—that is associated with the printer 124. Alternatively, the image server 104 may use caller ID messages 128 to identify the printer 124, and thereby to identify the user and individualized print queue that is associated with the print queue.

After extracting the selected image 102 and performing any processing to generate processed image 106, the image server 104 transmits the processed image 106 (and, if applicable, any other images that are in the user's individualized print queue) to the printer 124 over the communications network 112 using the image printing protocol (step 208). Printer 124 then prints the processed image 106 (step 210).

It should be appreciated that the techniques described above with respect to FIG. 3 have a variety of advantages. For example, the user may select selected image 102 for printing and cause the selected image 102 to be printed simply by pressing a "Print" button on printer 124. A connection is then automatically established between printer 124 and image server 104, and printer 124 then downloads and prints selected image 102 without requiring the subsequent involvement of the user. This process is much simpler from the user's point of view than the conventional process in which the user must manually download the selected image 102 to a local storage device, locate the downloaded image, print it, and then delete the selected image from the local storage device. The process shown and described above with respect to FIG. 3 instead allows the user to simply select an image and hit the printer's "Print" button to print it. Furthermore, since is not required that printer 124 be connected to image server 104 through an intermediate computer, such as host computer 116, the user may select the selected image 102 at one time and location using the host computer 116 and subsequently print the selected image 102 at a different time and location using the printer 124 even if the host computer is no longer accessible or available. The ability to connect the printer 124 directly to the communications network 112 without the use of an intermediate host computer increases the user's mobility when printing, particularly if the printer 124 is a portable printer.

It should be appreciated, however, that the host computer 116 may be used to send the "print" command to the printer 124 (FIG. 3, step 302). For example, upon selecting the selected image 102, the user may issue a "print" command using the host computer 116. In response, the host computer 116 may transmit a "print" command to the printer 124 over a connection such as a parallel or serial cable, instructing the printer 124 to print the selected image 102. The "print" command transmitted by the host computer 116 to the printer 124 may include a variety of information—such as the telephone number or Internet address of the image server 104, the Internet address of the selected image 102, and the user name and password of the user—to enable the printer 124 to successfully download and print the selected image 102. In response to receiving the "print" command from the host computer 116, however, the printer 124 may download and print the selected image 102 without the subsequent involvement of the host computer, as described above with respect to steps 304–312 of FIG. 3.

In various embodiments described above, the selected image 102 is one of a plurality of stored images 101, such as digital photographs, served by the image server 104. It should be appreciated, however, that the selected image 102 may be generated and stored in any manner prior to being downloaded and printed by the printer 124. In other words, the printer 124 is not limited to downloading and printing any particular kind of information or to printing information that has been generated in any particular manner.

Figure 4:
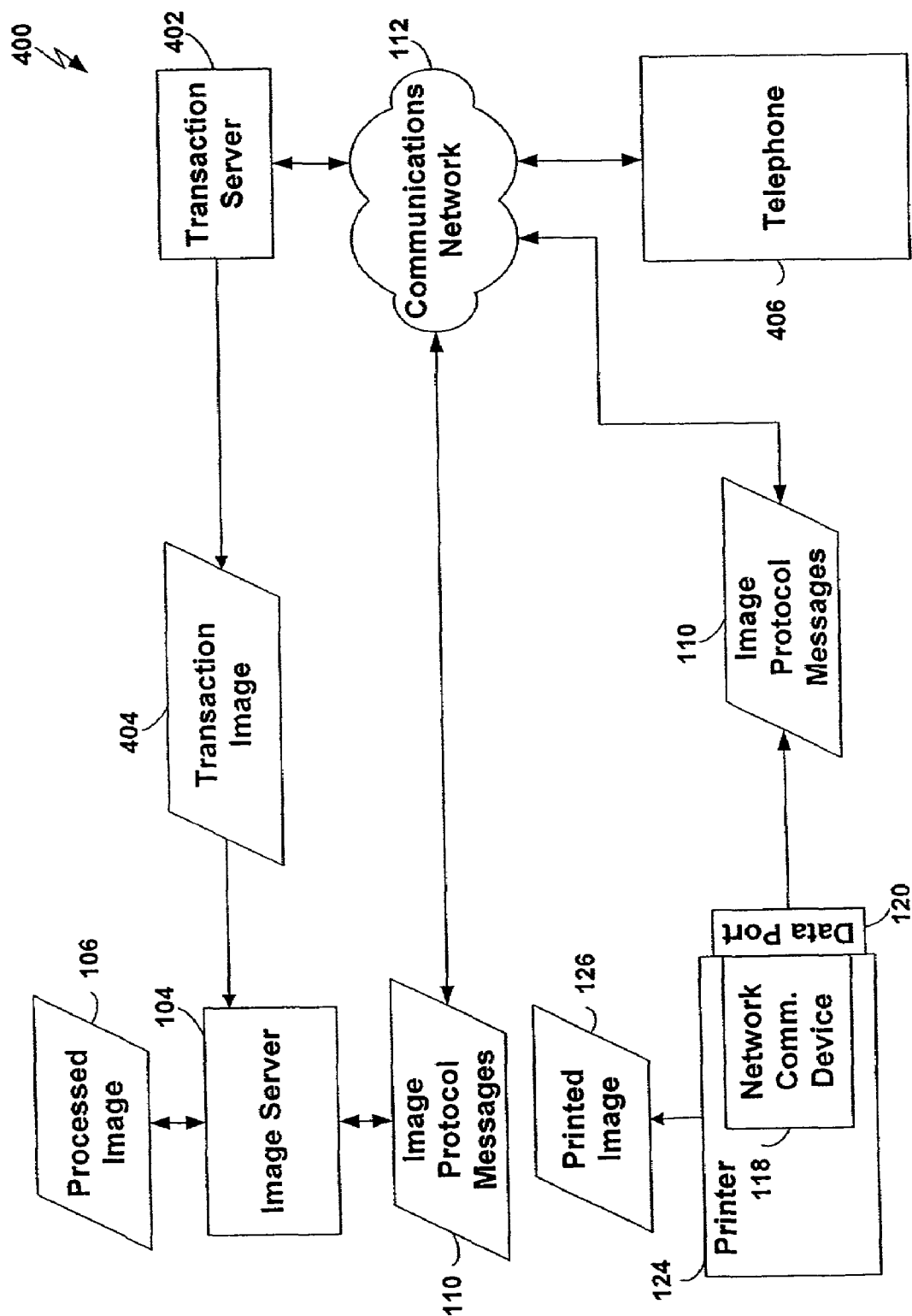
FIG. 4 is a block diagram of a system for downloading and printing an image generated by a transaction server according to one embodiment of the present invention.
Figure 5:
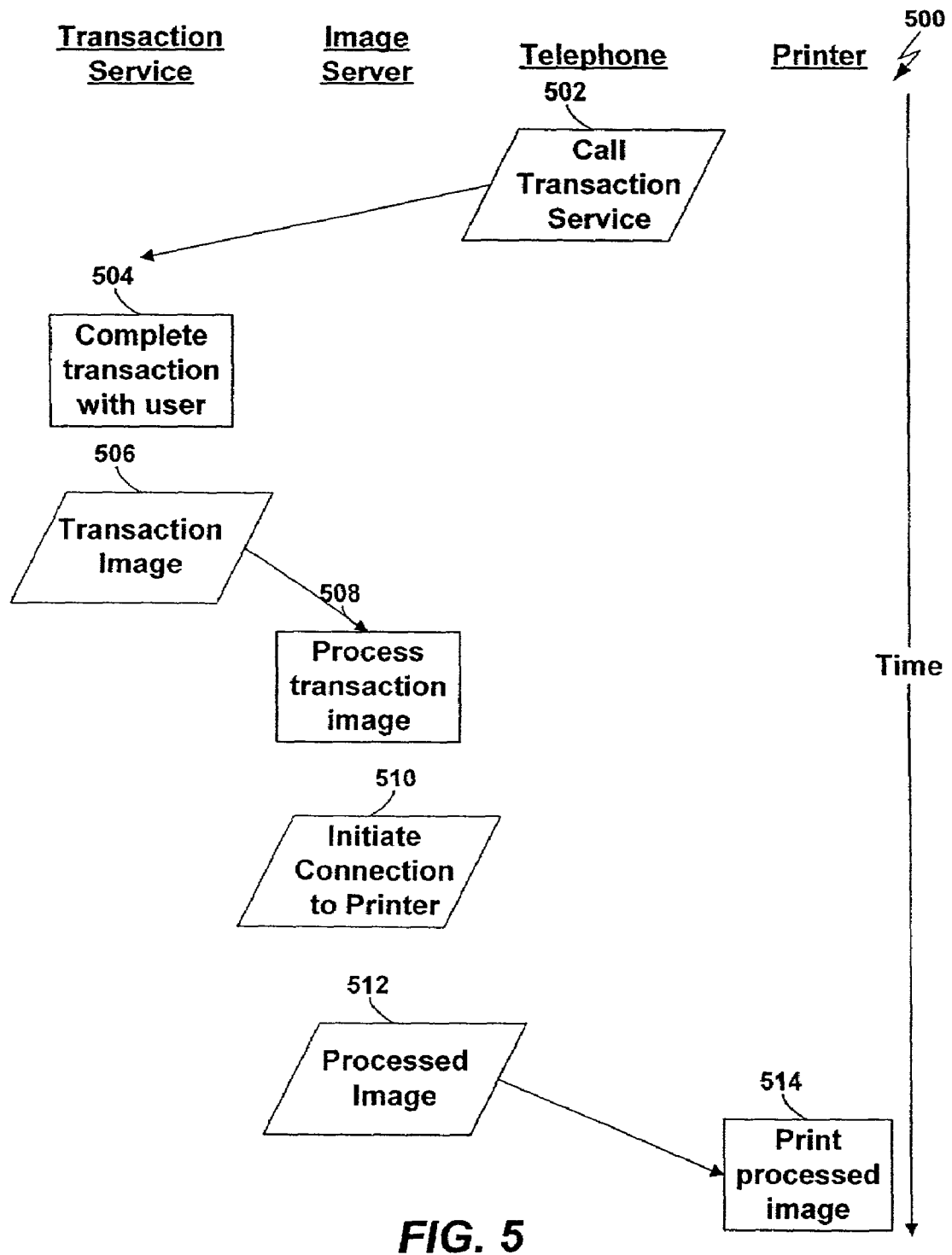
FIG. 5 is a data flow diagram of a process that is used by the system of FIG. 4 to print an image according to one embodiment of the present invention.

For example, referring to FIG. 4, in one aspect of the present invention, techniques are provided for using the printer 124 to print a transaction image 404 associated with a transaction. Referring to FIG. 5, a data flow diagram of a process 500 that may be used to download and print the transaction image 404 using the system 400 shown in FIG. 4 will now be described.

A user may use a telephone 406 to place a telephone call to a transaction server 402 over communications network 112 (step 502). The communications network 112 may, for example, be a POTS network. Alternatively, and as described in more detail in the co-pending application entitled "Method and Apparatus for Printing Remote Images Using a Mobile Device and Printer," the telephone 406 may be a cellular telephone and the communications network 112 may be a cellular voice or data network.

Transaction server 402 may be any transaction server, such as a service for purchasing event tickets or a service for requesting and/or purchasing information, such as maps, brochures, coupons, photographs, menus, or schedules. The user completes a transaction (such as purchasing a ticket) with transaction server 402 using a user interface provided by the transaction server 402 (step 504).

Upon completion of the transaction, transaction server 402 transmits a transaction image 404 to image server 104 (step 506). Transaction image 404 may be any image associated with the transaction, such as an image of the ticket purchased by the user. Transaction server 402 may transmit transaction image 404 to image server 104 over any network (such as the Internet) and using any protocol. Transaction server 402 may also transmit other information about the transaction (not shown) to the image server 104 to enable the image server 104 to identify the telephone 406 and/or the user of the telephone 406. For example, the transaction server 402 may transmit the telephone number of the telephone 406, as obtained using caller ID messages (not shown).

After completing the transaction with transaction server 402, the image server 104 may process the transaction image 404 to produce processed image 106 (step 508). The image server 104 may process transaction image 404 in any of a variety of ways, as described above with respect to processing of the selected image 102 in FIG. 1. As described in detail in the above-referenced application entitled "Method and Apparatus for Printing Remote Images Using a Mobile Device and Printer," the image server 104 may identify features of the printer 124 and process the selected image 102 so that processed image 106 is suitable for printing by printer 124.

The image server 104 then initiates a connection to the printer 124 over the communications network 112 using any of the techniques described elsewhere herein (step 510). It should be appreciated that the image server 104 and the printer 124 may communicate with each other over a different network than that used by the telephone 406 and the transaction server 402 to communicate with each other. For example, the telephone 406 may communicate with the transaction server 402 over a wireless voice network, and the image server 104 and the printer 124 may communicate with each other over a POTS network.

Upon initiation of the connection between the image server 104 and the printer 124, image server 104 transfers the processed image 106 (and, if applicable, any other images in the user's individualized print queue) to the printer 124 (step 512), which may then print printed image 126 (step 514). Image server 104 and printer 124 may communicate with each other over the communications network 112 using image protocol messages 110, as described above.

As described above with respect to FIGS. 4–5, in one embodiment of the present invention, the image server 104 may be used by the transaction server 402 for the image processing and printing capabilities provided by the image server 104. The particular example illustrated in FIGS. 4–5 is only one example of a manner in which the image server 104 may be used, and does not constitute a limitation of the present invention. More generally, capabilities of the image server 104—such as the ability to produce processed image 106 in accordance with particular capabilities of the printer 124 and the ability to transmit processed image 106 to printer 124 for printing over the communications network 112—may be used by other services in a variety of ways. Examples of such techniques are described in more detail in the co-pending application entitled "Method and Apparatus for Printing Remote Images Using a Mobile Device and Printer."

The image printing protocol may define any of a variety of messages for enabling communication between the image server 104 and the printer 124. For example, in one embodiment, the image printing protocol defines messages including the following:

INIT. This message is transmitted from the image server 104 to the printer 124 to notify the printer 124 that the image server 104 is requesting the initiation of communication between the image server 104 and printer 124. The image server 104 may, for example, transmit this message in response to receipt of the "print" command from the user (e.g., after step 202 in FIG. 2).

REQUEST_SPECS. This message is transmitted from the image server 104 to the printer 124 to request information about the printer 124. The manner in which this information may be used is described in more detail above.

TRANSMIT_SPECS. This message is transmitted from the printer 124 to the image server 104, in response to the REQUEST_SPECS message. Included in the message are the specifications requested by the server.

TRANSMIT_IMAGE. This message is transmitted from the image server 104 to the printer 124. The message includes the processed image 106 to be printed. The TRANSMIT_IMAGE message may, for example, be used to implement step 210 in FIG. 2.

END. This message is transmitted from the image server 104 to the printer 124 at the conclusion of transmission of the processed image 106 to the printer 124 (e.g., after step 210 in FIG. 2). After receipt of the END command from the image server 104, the printer 124 may print the processed image 106 (e.g., step 212 in FIG. 2).

It should be appreciated that messages 110 defined by the image printing protocol (such as the examples provided in the list above) may be encoded in any manner. It should be further appreciated that particular implementations of the image printing protocol may involve additional messages not shown here but which will be apparent to those of ordinary skill in the art. For example, messages transmitted by the image server 104 (such as the INIT command) may have corresponding acknowledgement (ACK) messages which are transmitted in response by the printer 124 as a method of handshaking. As another example, the TRANSMIT_IMAGE message may be transmitted from the image server 104 to the printer 124 as a plurality of messages, each of which contains a portion of the processed image 106. The image printing protocol may also include provisions for error detection and/or correction. Such implementation details of particular embodiments of the image printing protocol are not described here for simplicity of explanation and will be apparent to those of ordinary skill in the art.

It should be appreciated that the various embodiments described above are provided merely for purposes of example and do not constitute limitations of the present invention. Rather, various other embodiments are also within the scope of the claims, such as the following:

The printer 124 is described herein as performing various functions, such as communicating in accordance with the image printing protocol and printing the printed image 126, in accordance with various embodiments of the present invention. It should be appreciated that such functionality may be implemented within the printer 124 in any manner, such as by using hardware, software, firmware, or any combination thereof. In general, a printer "controller" refers herein generally to any such subsystem(s) of the printer 124 that perform the functions described herein.

Although the printer 124 is described herein as a device for printing images, it should be appreciated that more generally the term "printer" is used herein to refer to any device for receiving input and producing output. Such input/output may include not only static images but also an audiovisual stream (which may include an audio stream, a video stream, or any combination thereof). It should therefore be appreciated that the term "image" (when referring, for example, to the stored images 101 and the printed image 126) may refer not only to a static image, but to any of the kinds of information that the printer 124 may receive and output. The printer 124 may, for example, be a CD drive (such as a CD-ROM, CD-R, or CD-RW drive), DVD player, or MP3 player that includes the network communications device 118 and performs the other functions of the printer 124 that are described herein.

The host computer 116 may be any device that is capable of establishing a connection to the Internet 112. For example, the host computer 116 may be a conventional desktop or laptop computer, Personal Digital Assistant (PDA), or Internet appliance. A user of the host computer 116 may establish a connection between the host computer 116 and the Internet using techniques that are well-known to those of ordinary skill in the art. The host computer 116 may connect to the Internet or other network using any suitable network connection device.

Although server 104 is described herein as an "image server," it should be appreciated that more generally the server 104 is a printing server that may serve any kind of information—referred to herein as "printing information"—suitable for transmission to the printer 124. Similarly, stored images 101 may contain information other than images, and selected image 102 and processed image 106 may be information other than images. As used herein, the term "printing information" refers to information including but not limited to images, text, audiovisual streams, web pages, and any combination thereof. The printer 124 may further process the printing information that it receives (such as processed image 106) to produce printed image 126.

The network communications device 118 used by the printer 124 may be any communications device, such as a conventional analog modem, cable modem, Digital Subscriber Line (DSL) modem, or network interface card (NIC). The network communications device 118 may be either internal to the printer 124 or external to the printer 124, as long as the printer 124 includes a controller suitable for using the network communications device 118 to communicate over the communications network 112.

The communications network 112 may be any network or combination of networks. For example, the communications network may be a POTS network, wireless network, Local Area Network (LAN), Wide Area Network (WAN), or an internet such as the public Internet. The printer 124, host computer 116, and telephone 406 need not all communicate over the same network. For example, the telephone 406 may communicate with the transaction server 402 over a wireless network, while the printer 124 may communicate with the image server 104 over a POTS network. The single communications network 112 is shown in FIGS. 1 and 4 merely for ease of illustration.

Furthermore, the term "connection" as used herein (e.g., a connection between printer 124 and image server 104) refers to any kind of connection that enables communication between or among two or more devices. For example, a "connection" may be a physical and/or logical connection enabled by any combination of wired and/or wireless networks.

Although the image server 104 is described above as transmitting the processed image 106 directly to the printer 124, the image server 104 may transmit the processed image 106 to the transaction server 502, which may in turn transmit the processed image 106 over communications network 112 to printer 124. The transaction server 502 may communicate with printer 124 using the image printing protocol described above. As a result, the user may interact solely with the user interface provided by the transaction server's web site, and the capabilities (e.g., generation of the processed image 106) provided by the image server 104 may be provided transparently, without any interaction by or knowledge of the user. The image server 104 may therefore act as an application service that is used by the transaction server 502 to produce processed image 106 in a format that is suitable for printing by printer 124.

Although examples are provided above in which images are printed in response to actions performed by the user, this is not a limitation of the present invention. Rather, images may be automatically printed without any prompting by the user. For example, a coupon or advertisement may be automatically printed when a user navigates to a particular web site, without the initiation of any particular action by the user at that web site.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below. Other embodiments that fall within the scope of the following claims includes include, but are not limited to, the following.

What is claimed is:

1. A method for downloading and printing information stored on a remote print server that is accessible by a modem equipped printer via a POTS telephone line which is shared with a user's voice communications telephone having call waiting service enabled, said method comprising steps of:
   (A) initiating a connection between the printer and a printing server over a POTS telephone network by dialing a telephone number associated the printer server;
   (B) at the printer, performing steps of:
      (1) downloading printing information from the printing server through the connection; and
      (2) printing the printing information
   (C) interrupting step (B) (1) if an interrupting signal is detected on the connection between the printing server and the printer including terminating the connection with the print server when an interrupting call waiting signal is detected thereby allowing the user to establish a voice conversation with a party associated with the call waiting signal;
   (D) following the termination of the voice conversation, automatically re-establishing a connection between the printing server and the printer; and
   (E) at the printer, resuming download of the printing information from the printing server through the re-established connection.

2. The method of claim 1, wherein the printing information comprises processed printing information, and wherein the method further comprises a step of:
   (F) prior to the step (B), modifying source printing information based on capabilities of the printer to produce the processed printing information.

3. The method of claim 1, wherein the printing information comprises a graphical image, and wherein the step (B)(2) comprises a step of printing the graphical image on an output medium.

* * * * *